Dec. 25, 1923.
J. S. PARENTI
1,478,860
VEHICLE CONSTRUCTION
Filed Aug. 28, 1920      3 Sheets-Sheet 2
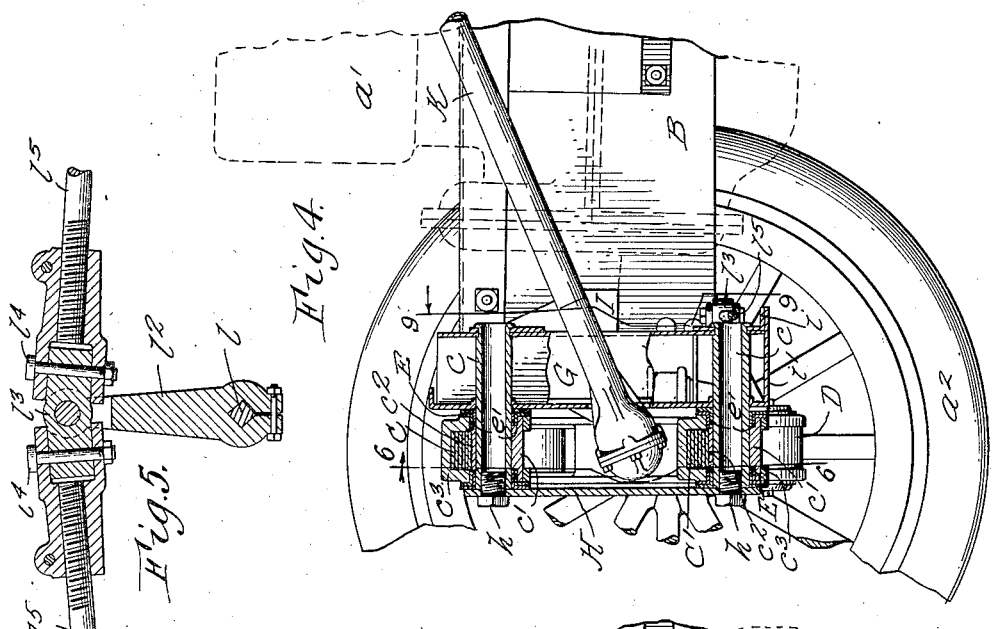
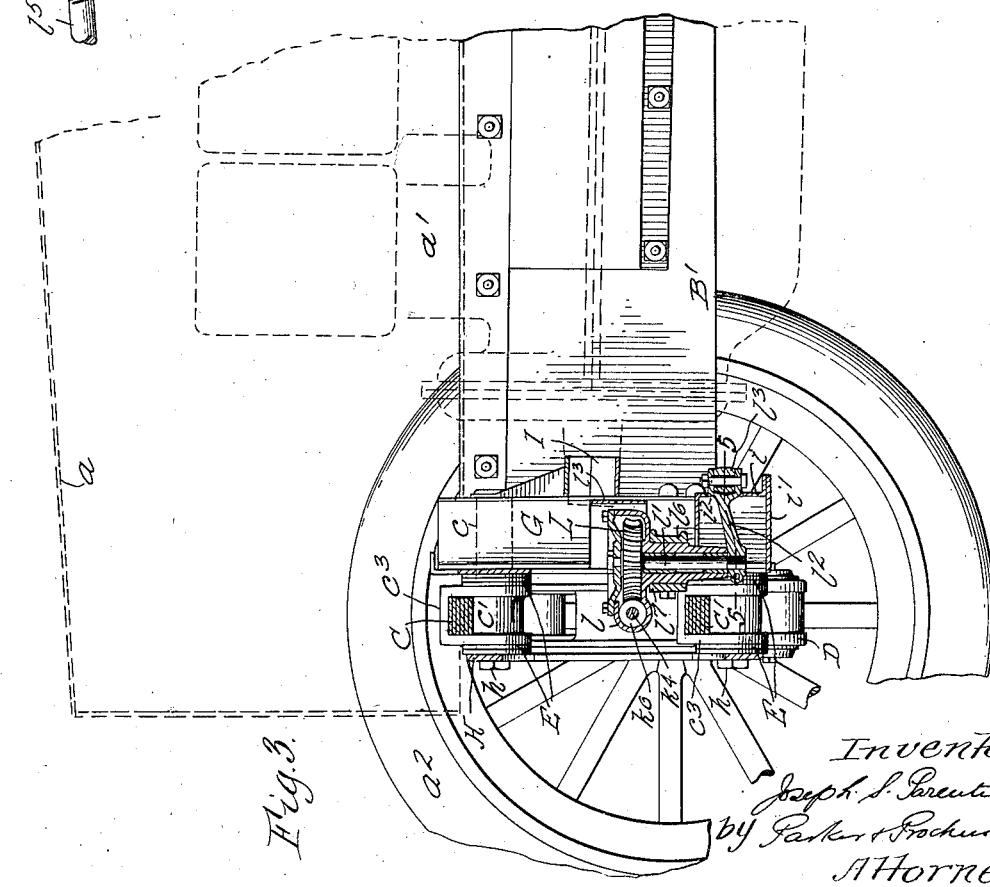
Inventor
Joseph S. Parenti
by Parker & Brochure
Attorneys

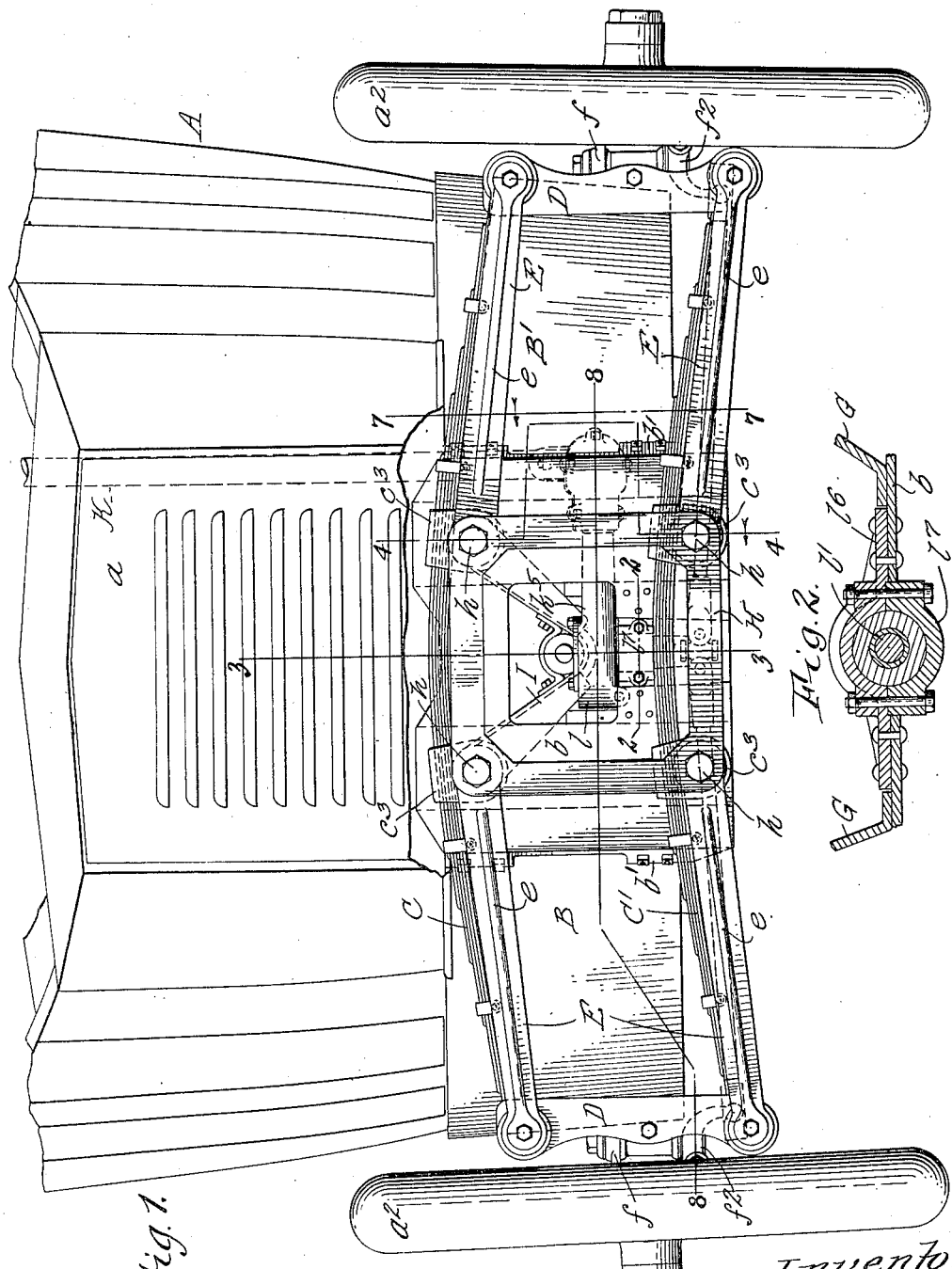

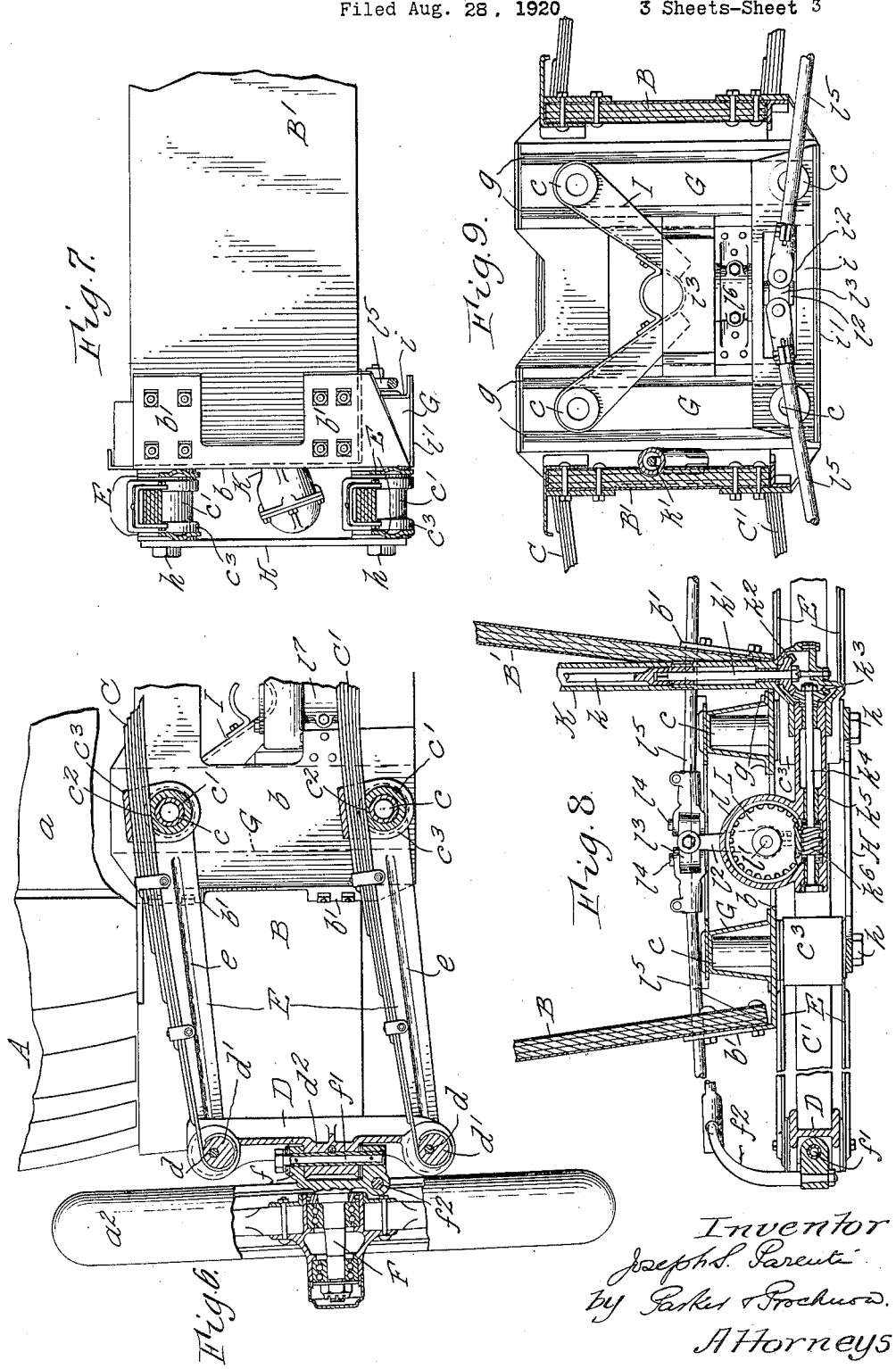

Patented Dec. 25, 1923.

1,478,860

UNITED STATES PATENT OFFICE.

JOSEPH S. PARENTI, OF BUFFALO, NEW YORK, ASSIGNOR TO PARENTI MOTORS CORPORATION, OF BUFFALO, NEW YORK.

VEHICLE CONSTRUCTION.

Application filed August 28, 1920. Serial No. 406,687.

*To all whom it may concern:*

Be it known that I, JOSEPH S. PARENTI, a citizen of the United States, residing at Buffalo, in the county of Erie and State of New York, have invented a new and useful Improvement in Vehicle Constructions, of which the following is a specification.

This invention relates to vehicles and more particularly to the connections between the vehicle body and the wheels of the vehicle.

The main object of this invention is to produce a motor vehicle of superior riding qualities and which will be light in weight and economical in the use of fuel, and with this end in view the vehicle is so constructed that the usual chassis is entirely omitted and the wheels and springs are supported from the body of the vehicle.

Other objects of the invention are to so construct the vehicle as to reduce as much as possible that portion of the weight of the vehicle which is not supported by the springs; also to provide means of improved construction for supporting the vehicle body from the wheels; also to provide means of improved construction for mounting the vehicle springs on the vehicle body; also to provide means of improved construction for supporting the front spring, steering gear and motor from the vehicle body; also to provide a steering mechanism of improved construction; also to improve the construction of motor vehicles in other respects hereinafter specified.

In the accompanying drawings:

Fig. 1 is a fragmentary front elevation of a motor vehicle embodying the invention, the usual mud guards of the vehicle being omitted.

Fig. 2 is a fragmentary horizontal section thereof, on an enlarged scale, on line 2—2, Fig. 1.

Fig. 3 is a longitudinal central sectional elevation thereof, on line 3—3, Fig. 1.

Fig. 4 is a longitudinal sectional elevation thereof on line 4—4, Fig. 1.

Fig. 5 is a fragmentary horizontal section thereof on line 5—5, Fig. 3, on an enlarged scale.

Fig. 6 is a transverse sectional elevation thereof on line 6—6, Fig. 4.

Fig. 7 is a longitudinal sectional elevation thereof on line 7—7, Fig. 1.

Fig. 8 is a fragmentary plan view thereof on line 8—8, Fig. 1.

Fig. 9 is a transverse sectional elevation thereof on line 9—9, Fig. 4.

The motor vehicle shown in the drawings includes a body A and hood $a$ under which an engine or motor $a'$ is arranged, and the usual vehicle wheels $a^2$, all of which may be of any usual or suitable construction and which of themselves constitute no part of this invention. The vehicle body, as shown in the drawings has a pair of longitudinally extending truss members B B', which in the construction shown are made of laminated wood, and which are connected at their front ends by means of a transverse plate $b$ preferably made of metal, the plate having rearwardly extending parts $b'$ which are suitably secured by means of bolts or the like to the truss members B B'. The transverse plate $b$ and the structure connected therewith form a spring supporting front transverse member of the vehicle body.

The vehicle body in the construction shown is supported from the front wheels by means of a pair of transversely extending leaf springs C C' arranged one above the other. The intermediate portions of the springs are connected with the vehicle body in any suitable manner, for example by means of studs or tubular spring-supporting members $c$ secured to the front transverse member of the vehicle body, two of these studs or tubular members being preferably used for each spring and being spaced apart so as to support the spring at opposite sides at the middle portion thereof. Any other means for securing the springs on a transverse plate or member of the vehicle body may be employed, if desired. The ends of the springs are secured to wheel carriers D on which the wheels $a^2$ are arranged. In the construction shown, each wheel carrier is provided with spring-supporting rods or pins $d$ on which eccentrics or the like $d'$ are pivotally mounted, the ends of the springs being arranged about the eccentrics.

The springs may be connected with the spring-supporting studs or tubular members $c$ in any desired manner. In the construction shown for this purpose, a bushing $c'$ is rotatably arranged on each stud or tubular member, each bushing being provided with a flattened portion $c^2$ on which the spring is adapted to bear. The springs are held in operative relation to the studs by means of shackles or straps $c^3$, which in the construction shown are of substantially inverted U-shape and which have holes through which the bushings $c'$ extend. The spaces between the flattened portions of the bushings and the closed ends of the shackles $c^3$ are occupied by the springs, which consequently fit loosely in this space and are slidable transversely of the vehicle and also adapted to turn or pivot to a limited extent relatively to the spring-supporting studs.

The arrangement of the springs and their connections with the body and wheel carriers is such that the springs alone under normal conditions would support the wheels and wheel carriers, but when the vehicle is subjected to lateral stresses, such for example as occur when the vehicle is making a turn, the wheels bend the springs and thus assume angular positions, which is objectionable. I, therefore, connect the wheel carriers with non-load carrying parts which serve to prevent the wheels from assuming decidedly angular positions and which parts add very little to the unsprung weight of the car. In the particular embodiment of the invention shown, the wheel carriers D are connected with the body or frame of the car by means of spacing or distance members or links E which connect the studs or tubular spring supports $c$ of the body and the pins $d$ of the wheel carriers. These spacing members are preferably made of stamped metal and may be provided with a longitudinal reinforcing bead $e$, and each stud $c$ and the corresponding pin $d$ are connected in the construction shown by two of these spacing members, the spacing members being arranged at opposite sides of the spring. These spacing members form with each wheel carrier and the body of the vehicle, parallelograms, which maintain the wheel carriers in definite, angular relations with reference to the vehicle body regardless of deflections of the springs. The ends of the spacing members which are secured to the spring-supporting studs are preferably provided with annular, offset portions $e'$ which extend into annular recesses in the bushings $c'$, thus securely connecting the spacing members with the spring-supporting studs. As the springs are deflected, any change of length of the springs with reference to the spacing members is compensated for by means of the eccentrics $d'$. On account of this construction the springs need not be securely held or clamped to the studs or tubular spring supports $c$, since the spacing members E fix the locations of the wheel carriers and the springs with reference to the body of the vehicle. Other means for holding the wheel carriers so as to support the wheels in substantially upright positions may be provided.

By means of the construction described, the springs have a two-fold action. In the first place the portions of the springs extending from the studs $c$ to the wheel carriers yield or bend to cushion the blows received by the wheels, and the yielding of the outer portions of these springs also causes corresponding deflections of the middle portions of the springs connecting the studs $c$ so that the middle portions of the springs also assist in absorbing and cushioning the shocks to which the wheels are subjected. The middle portion of each spring, therefore, cooperates with either end of the spring to absorb shocks, thus producing a thorough cushioning effect which produces an exceptionally comfortable riding vehicle. The construction described also has the advantage of being light in weight and of greatly reducing the unsprung weight of the car. The usual axles connecting the wheels are entirely eliminated, thus permitting each wheel to act independently of the other wheels. This results in a very smooth riding vehicle, since by reducing the unsprung weight of the car to a minimum, a large proportion of the shocks received by the wheels, due to unevenness of the road, are entirely taken up by the springs and are not transmitted to the vehicle body. By eliminating the usual axle, the wheels act entirely independently of each other, and by reducing the unsprung weight of the car the momentum of the unsprung parts is greatly reduced so that each wheel is kept by the springs in more constant contact with the road, thereby greatly improving the riding qualities of the vehicle.

The wheel carriers D may be of any suitable or desired construction, those shown being intended to be used in connection with the front wheels of the vehicle. The wheel-supporting members D shown are provided with bosses or projections $d^2$ on which the stud axles F of the wheels are pivoted. The stud axles as shown are provided with bracket or hinge portions $f$ which are pivotally connected with the extensions $d^2$ of the wheel carriers by means of knuckle pins $f'$ producing steering knuckles which permit the stud axles to swing relatively to the wheel carriers. The bracket portions $f$ are provided with arms $f^2$ of any suitable construction, by means of which the front wheels of the vehicle may be turned about the knuckle pins $f'$ for steering the vehicle. Any other means for supporting the wheels from the wheel carriers may be provided. The drawings show the manner of connecting the front wheels of a vehicle to the transverse springs, but it is not intended to limit the spring construction to front wheels, since this construction may be used equally well in connection with the rear or driving wheels of a vehicle.

The front, transverse, spring-supporting member of the vehicle may be of any suitable or desired construction. In order to rigidly mount the spring-supporting studs or tubular members on the front, transverse member, the following construction is preferably employed.

The transverse plate $b$ is provided with a pair of substantially upright, U-shaped, reinforcing members G, which are suitably secured to the rear face of the transverse plate $b$. In the construction shown, the front edges of the reinforcing members are flanged as shown at $g$ and these flanges are rigidly secured in any suitable manner to the transverse plate $b$. The studs or spring-supporting members $c$ extend through the plate $b$ and the rear ends thereof are riveted or otherwise secured to the rear faces of the reinforcing members G. The reinforcing members, therefore, not only reinforce the transverse plate $b$ but also afford a second support for each spring-supporting stud, at a distance from the transverse plate $b$. In order to further strengthen the spring-supporting studs, the front ends thereof are preferably connected by means of a plate H, which in the constuction shown is in the form of a hollow square, the corner portions of this plate being provided with holes in which the front ends of the spring-supporting studs are secured. In the construction shown, the front plate H is secured to the spring-supporting studs or tubular members by means of screws $h$ or the like. The rear ends of the spring-supporting tubular members are preferably slightly reduced in diameter to form shoulders abutting against the rear faces of the reinforcing members G and the ends of these studs are turned over or riveted to securely hold the studs in place with reference to the reinforcing members.

It is desirable also to support the front end of the motor $a'$ from the front, transverse member of the body and for this purpose a hanger or strap I is secured to the rear face of the front, transverse member to form a support for the front end of the motor. The hanger is preferably also supported from the upper two, spring-supporting studs or members $c$, it being also held on the studs by means of the over-turned or riveted ends of these studs, which press the hanger rigidly against the rear faces of the upright, reinforcing members G. The hanger is preferably made of stamped metal and is formed in any suitable manner to receive the front end of the motor and also reinforces the front, transverse member of the body by forming a connection between the two reinforcing members G. In order to form a similar rigid connection between the lower portions of the reinforcing members G, a plate or member $i$ connects the rear ends of the two lower studs or tubular spring-supporting members. The lower edge of this plate is preferably flanged and is suitably secured to a lower horizontal portion $i'$ of the transverse plate $b$. The lower reinforcing plate $i$, in the construction shown, has a slot $i^2$ through which parts of the steering mechanism extend, as shown in Fig. 9. The front end of the motor is preferably further supported by a plate or member $i^3$, the ends of which are secured to the transverse plate $b'$ and the intermediate portion of which extends rearwardly into a position to support the front end of the motor. Any other suitable means for forming a strong, rigid, transverse member connecting the side truss members B and supporting the springs of the vehicle may be employed.

The steering mechanism for the vehicle is preferably also arranged on the front, transverse member of the vehicle body. K represents the tubular housing or column for a steering rod or shaft $k$ arranged within the column. This rod connects at its lower end with a rod section $k'$ to the end of which is secured a bevel gear $k^2$. This bevel gear meshes with another bevel gear $k^3$ secured on a shaft $k^4$ which is arranged in a housing $k^5$ secured on the front, transverse member of the vehicle, this housing being suitably connected with the steering column K. The shaft $k^4$ has a worm wheel $k^6$ which meshes with a worm gear L, which is suitably housed in an enlarged portion $l$ of the housing $k^5$. The worm gear L is rigidly secured to a substantially upright shaft $l'$ at the lower end of which an arm $l^2$ is rigidly secured. This arm, in the construction shown, extends rearwardly through the slot $i^2$ of the reinforcing plate $i$, and is provided at its outer end with a connecting member $l^3$, pivotally secured in a bifurcated end of the arm $l^2$. The opposite ends of this connecting member are pivotally connected at $l^4$ with two steering rods $l^5$ which connect with the steering arms $f^2$ secured to the steering knuckles of the front wheels. The pivotal connection between the arm $l^2$ and the connecting member $l^3$ and the pivot members $l^4$ are arranged at right angles to each other, so that universal joints are formed between the arm $l^2$ and the steering rods $l^5$. The worm gear L and the arm $l^2$ are preferably arranged substantially in the center of the front, transverse member of the body, so that the steering rods $l^5$ are free to swing relatively to the arm $l^2$ when the front springs of the vehicle are deflected. For this purpose the shaft $l'$, on which the arm $l^2$ is mounted, is journalled in a bearing arranged centrally on the transverse plate $b$ and comprising a main bearing member $l^6$, Fig. 2, which bridges a hole or cut-away portion of the transverse plate $b$ and a bearing member $l^7$ secured to the bearing member $l^6$.

By means of this arrangement the steering mechanism can be mounted on the front transverse member of the vehicle and can be so connected with the wheels as to be unaffected by any relative movement between the wheels of the vehicle body.

The spring construction described has the advantages that the arrangement of the springs one above the other as shown, and their connection with the wheel carriers D is such that the springs alone under normal conditions tend to hold the wheels in correct relation to the body so that under such normal conditions, no axle or connection with the wheel carriers and body is needed. Consequently, in order to hold the wheels in correct relation to the body when subjected to a side thrust, or under other special conditions, a relatively light structure can be employed, the usual heavy load-carrying axle being omitted, thus reducing the unsprung weight of the car. While spacing members of the kind described are preferably employed to hold the wheel carriers in correct relation to the car, yet it is not intended to limit the invention to such spacing members, since other means engaging the wheel carriers to hold the same against moving out of substantially upright positions may be employed in connection with the spring arrangement described without departing from this invention.

I claim as my invention:—

1. In a vehicle, the combination with the wheels and body thereof, of a wheel carrier for each wheel, spacing members which are pivotally connected to said wheel carriers and said body and space said wheel carriers at definite distances from said body, and springs extending transversely of said body and having their ends connected to oppositely disposed wheel carriers above and below the wheel axles, whereby under normal conditions the weight of the body is transmitted to the wheels substantially independently of said spacing members.

2. In a vehicle, the combination with the wheels and body thereof, of a wheel carrier for each wheel, spacing members pivotally connected to said body and said wheel carriers to hold said wheel carriers in definite relation to said body, and a plurality of springs secured to said body and connected at their ends to said wheel carriers in proximity to the pivotal connection between the spacing members and said wheel carriers above and below the wheel axles, whereby under normal conditions the weight of the body is transmitted to the wheels substantially independently of said spacing members.

3. In a vehicle, the combination with the wheels and body thereof, of a wheel carrier for each wheel, a plurality of springs connecting each wheel and carrier with said body, each of said springs having a part secured on said body and having an end connected with a wheel carrier, and a plurality of substantially parallel rigid links spaced apart and pivotally connected with said wheel carrier and said body, whereby said wheel carrier is maintained by said links in definite angular relation to said body, each spring being arranged in immediate proximity to a link, whereby parts of said springs swing through the same angle as said links.

4. In a vehicle, the combination with the wheels and body thereof, of a wheel carrier for each wheel, a plurality of links pivotally connecting the wheel carriers with the body to hold the wheel carriers in definite angular relations to said body, and springs for supporting said body from said wheel carriers, and which transmit the weight of the body to portions of said wheel carriers positioned above and below the axes of the wheels.

5. In a vehicle, the combination with the wheels and body thereof, of a wheel carrier for each wheel, a plurality of links pivotally connected with the wheel carrier and body to hold the wheel carriers in definite angular relations to said body, and a spring connected at its opposite ends to a pair of oppositely disposed wheel carriers and connected at its intermediate portion with said body and slidable in the direction of its length with reference to said body.

6. In a vehicle, the combination with the wheels and body thereof, of a wheel carrier for each wheel, a spring connecting a pair of wheel carriers and connected with said body to slide relatively thereto in a direction lengthwise of the spring, and means for positioning said wheel carriers relatively to said body independently of said spring.

7. In a vehicle, the combination with the wheels and body thereof, of a wheel carrier for each wheel, a plurality of springs extending transversely of said body and having their ends connected to oppositely disposed wheel carriers above and below the axles of the wheels, said springs transmitting the weight of the body to said wheel carriers and holding said wheel carriers under normal conditions in definite angular and operative relation to said body, and means independent of said springs for positively holding said wheel carriers in definite angular relation to the body when the vehicle is subjected to side thrusts or the like.

8. A vehicle in accordance with claim 7 in which the holding means are non-load-carrying and hold the wheels substantially upright.

9. The combination of a leaf spring for connecting parts of a vehicle, a pair of spring supports spaced apart and secured to one of said parts of the vehicle, means for pivotally connecting the intermediate portion of said spring to said supports, means for permitting said spring to slide in the direction of its length relatively to at least one of said supports, and means for connecting the opposite ends of the spring to other parts of the vehicle, whereby a deflection of either of said ends of the spring will cause a deflection in the opposite direction of the part thereon between said supports.

10. The combination of a leaf spring for vehicles, means for connecting said spring to a part of a vehicle, said means engaging the intermediate portion of the spring at distances from each other, at least one of said connecting means permitting said spring to move relatively to said means in the direction of the length of the spring, and means for connecting the opposite ends of the spring to other parts of the vehicle, whereby deflections of said end of the spring will produce corresponding deflections in the opposite direction of the part of the spring between said first mentioned connecting means.

11. The combination of a leaf spring for vehicles, a pair of studs spaced apart and secured to one part of the vehicle, sleeves rotatably mounted on said studs and to which the intermediate portion of said spring is secured, and means for securing the ends of said spring to other parts of the vehicle, whereby a deflection of the ends of the spring will cause a corresponding opposite deflection of the part of the spring arranged between said studs.

12. The combination of a leaf spring for vehicles, a pair of studs spaced apart and secured to one part of the vehicle, sleeves rotatably mounted on said studs and to which said spring is secured, said spring having a sliding connection with at least one of said sleeves, and means for securing the end of said spring to another part of the vehicle, whereby a deflection of the end of the spring will cause a corresponding opposite deflection of the part of the spring arranged between said studs.

13. The combination of a leaf spring for vehicles, a pair of studs spaced apart and secured to one part of the vehicle, sleeves rotatably mounted on said studs and to which said spring is secured, at opposite sides of the middle portion of the spring, and means for securing the opposite ends of said spring to other parts of the vehicle, whereby deflections of either end of the spring will cause corresponding deflections of the middle portion of the spring.

14. The combination of a leaf spring for vehicles, a pair of cylindrical spring-supporting members spaced apart and secured to one part of the vehicle, sleeves rotatably mounted on said spring-supporting members, straps embracing said springs and holding the same in engagement with said sleeves, said straps being held on said sleeves, and means for securing the ends of said spring to other parts of the vehicle.

15. The combination of a leaf spring for vehicles, a pair of cylindrical spring-supporting members spaced apart and secured to one part of the vehicle, sleeves rotatably mounted on said spring-supporting members, each sleeve having a flat portion on its outer surface, a strap for each sleeve extending around the spring and holding said spring in engagement with said flat portion of the sleeve, and means for securing the ends of said spring to another part of the vehicle.

16. In a vehicle, the combination with the wheels and body thereof, of a spring supporting said body from the wheels, a pair of spring-supporting members mounted on said body and which engage the spring at opposite sides of the center thereof, wheel carriers to which the outer ends of said springs are connected, and distance members pivotally connected to said spring supporting members and said wheel carriers to hold said carriers in definite angular relation to said body.

17. In a vehicle, the combination with the wheels and body thereof, of a spring supporting said body from the wheels, a pair of spring-supporting members mounted on said body and spaced apart, wheel carriers on which the wheel axles are mounted, links connecting said spring-supporting members and said wheel carriers and holding said wheel carriers in definite relations to said body, a spring connected to said wheel carriers, and means for connecting said spring with said spring-supporting members and permitting said spring to move in the direction of its length relatively to said spring-supporting members.

18. In a vehicle, the combination with the wheels and body thereof, of a spring supporting said body from the wheels, a pair of spring supporting members mounted on said body and spaced apart, a sleeve rotatably mounted on said spring-supporting members, wheel carriers on which the wheel axles are mounted, links connecting said sleeves and said wheel carriers for holding said wheel carriers in definite relations to said body, and a spring secured to said sleeves and to said wheel carriers.

19. In a vehicle, the combination of a body having a transversely extending member, reinforcing members secured to said transverse member and having parts extending at a distance from said member, spring-supporting members extending through and secured to said transversely extending member and to said reinforcing member, and transversely arranged springs secured to said spring supporting members and supporting said body.

20. In a vehicle, the combination of a body having a front transverse plate, reinforcing members secured to said transverse plate and having parts extending at a distance from said plate, spring-supporting studs extending through and secured to said plate and said reinforcing members, springs mounted on said studs, and a second plate connecting the outer ends of said studs beyond said springs.

21. In a motor vehicle, the combination of a body having a front transverse plate, reinforcing members secured to said transverse plate and having parts extending at a distance from said plate, spring-supporting studs extending through and secured to said plate and said reinforcing members, springs mounted on said studs, and a motor-supporting member suspended from said studs and connecting and reinforcing the same.

22. In a motor vehicle, the combination of a body having a front transverse plate, a plurality of upright reinforcing members of substantially U-shape having their edges secured to said plate, spring-supporting stud members extending through and secured to said plate and said reinforcing members, springs mounted on said studs, and motor-supporting members connecting adjacent reinforcing members and secured to said studs.

23. In a vehicle, the combination of a body having a transversely extending member, reinforcing members secured to said transverse member and having parts extending at a distance from said member, spring-supporting members extending through and secured to said plate and to said reinforcing member, transversely arranged springs secured to said spring-supporting members and supporting said body, and steering mechanism for said vehicle mounted on said transverse member.

24. In a vehicle, the combination of a body having a front transverse plate, spring-supporting members mounted on said plate, springs for supporting said body mounted on said spring-supporting members, means on said transverse plate for supporting the front end of a motor, and steering mechanism for said vehicle mounted on said transverse plate.

25. In a vehicle, the combination of a body having a front transverse member, wheel carriers on which the wheel axles are mounted, springs connected to said body and said wheel carriers, and a plurality of spacing members each of which is connected to said body and to a wheel carrier, said spacing members and said springs forming the only supporting connections between said body and said wheel carriers and between the several wheel carriers.

26. In a vehicle, the combination of a body having a front transverse member, wheel carriers on which the wheel axles are mounted and which are arranged at opposite sides of said transverse member, a plurality of spacing members, each of which is pivotally connected to said body and to a wheel carrier, a transverse spring secured on said transverse member and having its opposite ends connected with said wheel carriers, a pair of steering rods connected with said axles, and mechanism centrally disposed on said transverse member and connected with said rods for steering the vehicle.

27. In a vehicle, the combination of a body having a front transverse member, wheel carriers on which the wheel axles are mounted and which are arranged at opposite sides of said transverse member, a plurality of spacing members, each of which is pivotally connected to said body and to a wheel carrier, a transverse spring secured on said transverse member and having its opposite ends connected with said wheel carriers, a pair of steering rods connected with said axles, an arm pivoted on the middle portion of said transverse rods, a steering column arranged at one side of said body, and mechanism connecting said steering column and said arm.

28. In a vehicle, the combination with the wheels and body thereof, of a wheel carrier for each wheel and having a stud axle on which the wheel is mounted, springs extending transversely of the body and having their intermediate portions secured to said body and having their ends arranged to transmit the weight of the body to said wheel carriers at points above and below said stud axles, and rigid means connected with said wheel carriers to hold said wheels in approximately upright positions.

29. In a vehicle, the combination with the wheels and body thereof, of a wheel carrier for each wheel, springs for transmitting the weight of the body to said wheel carriers, said springs being so arranged as to transmit the weight of the body to portions of said wheel carriers located above and below the axes of the wheels, and rigid means connected with said wheel carriers and movable relatively to the body to hold said wheel carriers at substantially definite angular relations to each other.

30. In a motor vehicle, the combination of a body having side plates and an end plate rigidly secured together, said plates being arranged in substantially upright planes, a pair of springs extending substantially parallel to said end plate adjacent to the upper and lower parts thereof and secured thereto, and wheel carriers to which the ends of said springs transmit the weight of said body, said springs transmitting the weight to said wheel carriers to portions thereof located above and below the axes of the wheels.

31. In a motor vehicle, the combination of a body having side plates and an end plate rigidly secured together, said plates being arranged in substantially upright planes, a pair of springs extending substantially parallel to said end plate adjacent to the upper and lower parts thereof and secured thereto, wheel carriers to which the ends of said springs transmit the weight of said body, and spacing members connected to said wheel carriers to hold said wheel carriers in positions in which said wheels are maintained in correct angular relations to the ground.

32. In a motor vehicle, the combination of a body having side plates and an end plate rigidly secured together, said plates being arranged in substantially upright planes, a pair of springs extending substantially parallel to said end plate adjacent to the upper and lower parts thereof and secured thereto, wheel carriers to which the ends of said springs transmit the weight of said body, and spacing members connected to said wheel carriers and to the body for holding said wheels at definite angular relations to the body.

33. In combination with the front wheels of an automobile and a support for each, a frame, a center column plate connected to the frame, upper and lower parallel radius rods connected at their outer ends to the respective wheel supports and pivoted at their inner ends to the column plate, an upper leaf spring secured between its ends to the column plate, a parallel lower leaf spring secured between its ends to the column plate, and links pivotally connecting the outer ends of the springs to the wheel supports.

34. In combination with an automobile frame having side members, a cross member secured to the side members and depending therefrom, a column plate attached to the cross member and having upper and lower seats, carriers for the automobile wheels, leaf springs secured at their centers on said seats, upper and lower parallel radius rods connected at their outer ends to the carriers and pivoted at their inner ends to the opposite sides of the column plate, and links pivotally connecting the free ends of the spring to the carriers.

35. In combination with an automobile frame, the front wheels thereof and a carrier for each of said wheels, a central support connected to the frame, parallel upper and lower rods connected to the carriers and pivoted to the support, springs centrally connected to the support and at their outer ends being pivotally connected to the carriers, a steering rod connecting the carriers, and guiding means between the steering rod and the central support.

Witness my hand this 26th day of August, 1920.

JOSEPH S. PARENTI.

Witnesses:
H. C. GORTZIG,
WILLARD C. WHEELER.